US009612558B1

(12) United States Patent
Okabayashi (10) Patent No.: US 9,612,558 B1
(45) Date of Patent: Apr. 4, 2017

(54) IMAGE FORMING APPARATUS (71) Applicant: FUJI XEROX CO., LTD., Tokyo (JP)

(72) Inventor: Yasuto Okabayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/139,809

(22) Filed: Apr. 27, 2016

(30) Foreign Application Priority Data

Dec. 8, 2015 (JP) ................................ 2015-239119

(51) Int. Cl.
*G03G 15/20* (2006.01)
*G03G 15/00* (2006.01)
*G06K 15/16* (2006.01)
*G06K 15/02* (2006.01)

(52) U.S. Cl.
CPC ......... *G03G 15/5029* (2013.01); *G06K 15/16* (2013.01); *G06K 15/1835* (2013.01)

(58) Field of Classification Search
CPC .......... G03G 15/0889; G03G 15/0865; G03G 15/0879; G03G 2215/0132
See application file for complete search history.

(56) References Cited

U.S. PATENT DOCUMENTS

2005/0169650 A1* 8/2005 Ito .................. G03G 15/5029
399/45
2015/0378297 A1* 12/2015 Nakura ............. G03G 15/6558
399/395

FOREIGN PATENT DOCUMENTS

JP     11-015220 A    1/1999
JP     2002-169344 A  6/2002

* cited by examiner

*Primary Examiner* — David Gray
*Assistant Examiner* — Michael Harrison
(74) *Attorney, Agent, or Firm* — Sughrue Mion, PLLC (57) ABSTRACT

An image forming apparatus includes an image forming device, an area coverage calculation section, and an image data rotating section. The image forming device forms a toner image in accordance with image data without setting margins at edges of a first recording medium. The area coverage calculation section calculates an area coverage of the image data for a certain region at each of the edges of the first recording medium. The image data rotating section rotates the image data by a certain angle, when the calculated area coverage at one of the edges is a certain value or more, so that the one of the edges is not on a leading edge side of the first recording medium in a transport direction.

8 Claims, 10 Drawing Sheets

R: SEPARATION FAILURE
Y: IMAGE DAMAGE AT LEADING EDGE
G: GOOD SEPARATION

| AREA COVERAGE | TOP MARGIN | THIN SHEET | HIGH-QUALITY SHEET | CARDBOARD |
|---|---|---|---|---|
| HIGH | 0 mm | R | R | G |
| HIGH | 2 mm | R | Y | G |
| HIGH | 4 mm | G | G | G |
| MIDDLE | 0 mm | R | Y | G |
| MIDDLE | 2 mm | Y | G | G |
| MIDDLE | 4 mm | G | G | G |
| LAW | 0 mm | Y | G | G |
| LAW | 2 mm | G | G | G |
| LAW | 4 mm | G | G | G |

IMAGE FORMING APPARATUS

CROSS-REFERENCE TO RELATED APPLICATIONS

This application is based on and claims priority under 35 USC 119 from Japanese Patent Application No. 2015-239119 filed Dec. 8, 2015.

BACKGROUND

Technical Field

The present invention relates to an image forming apparatus.

SUMMARY

According to an aspect of the present invention, an image forming apparatus includes an image forming device, an area coverage calculation section, and an image data rotating section. The image forming device forms a toner image in accordance with image data without setting margins at edges of a first recording medium. The area coverage calculation section calculates an area coverage of the image data for a certain region at each of the edges of the first recording medium. The image data rotating section rotates the image data by a certain angle, when the calculated area coverage at one of the edges is a certain value or more, the one of the edges is not on a leading edge side of the first recording medium in a transport direction.

BRIEF DESCRIPTION OF THE DRAWINGS

Exemplary embodiment of the present invention will be described in detail based on the following figures, wherein.

DETAILED DESCRIPTION

Next, an exemplary embodiment and a specific example of the present invention will be described in further detail below with reference to the drawings. It should be understood that the present invention is not limited to the exemplary embodiment and the specific example.

Furthermore, it should be noted that the drawings referred to in the following description are schematically illustrated and, for example, not to scale, and illustration of elements not required for the description is omitted as appropriate for ease of understanding.

(1) An Overall Structure and Operation of an Image Forming Apparatus 1

Figure 1:
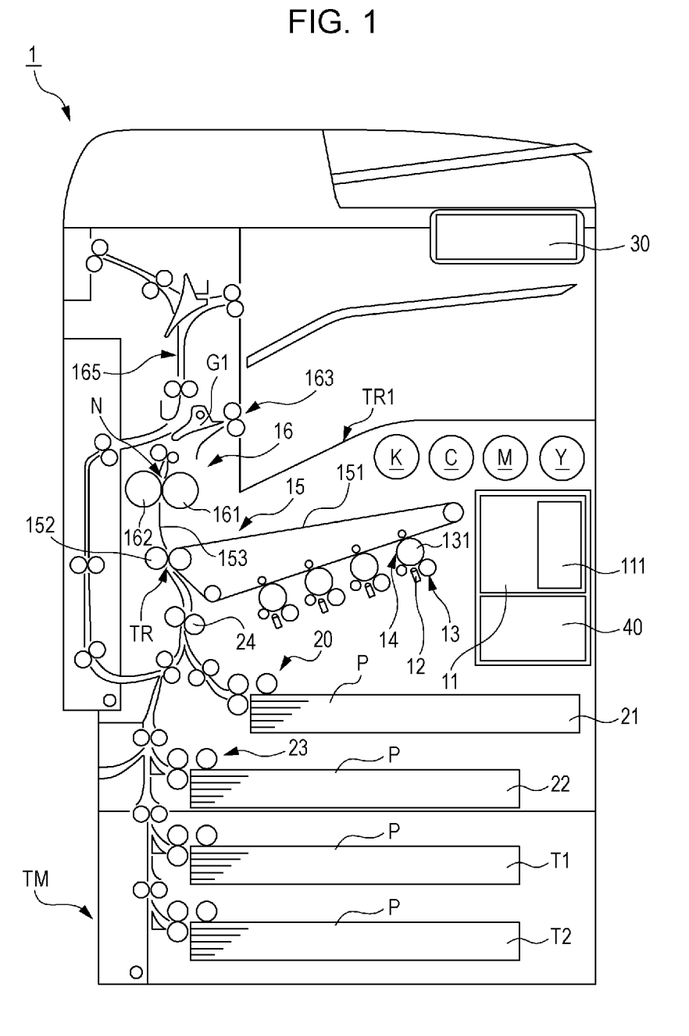
FIG. 1 is a schematic sectional view of an internal structure of an image forming apparatus.

FIG. 1 is a schematic sectional view of an internal structure of the image forming apparatus 1 according to the present exemplary embodiment.

An overall structure and operation of the image forming apparatus 1 are described below with reference to the drawings.

(1.1) The Overall Structure of the Image Forming Apparatus 1

The image forming apparatus 1 includes an image forming section 10, a sheet feed device 20 attached at a bottom portion of the image forming section 10, an operating information unit 30, and an image processing unit 40.

The image forming section 10 includes a system controller 11, light exposure devices 12, photosensitive units 13, developing devices 14, a transfer device 15, and a fixing device 16. The image forming section 10 receives image data from the image processing unit 40 and forms toner images of the image data on sheets of paper P fed from the sheet feed device 20.

The sheet feed device 20 that includes sheet trays 21 and 22 is provided at the bottom portion of the image forming section 10. Furthermore, a tray module TM is connected to a lower portion of the sheet feed device 20 so as to feed the sheets P to the image forming section 10. The tray module TM includes sheet trays T1 and T2 that are vertically stacked to form a multi-tray structure (two trays according to the present exemplary embodiment) and that contain the sheets P.

That is, plural trays that contain different types (for example, material, thickness, sheet size, and paper grain) of the sheets P are provided, and each of the sheets P fed from the corresponding one of these plural trays is supplied to the image forming section 10.

The operating information unit 30 corresponds to a so-called user interface. Specifically, the operating information unit 30 includes a liquid crystal display panel, various operating buttons, a touch panel, and so forth combined with one another, so that the operating information unit 30 is used to input various settings and instructions and display information.

Figure 2:
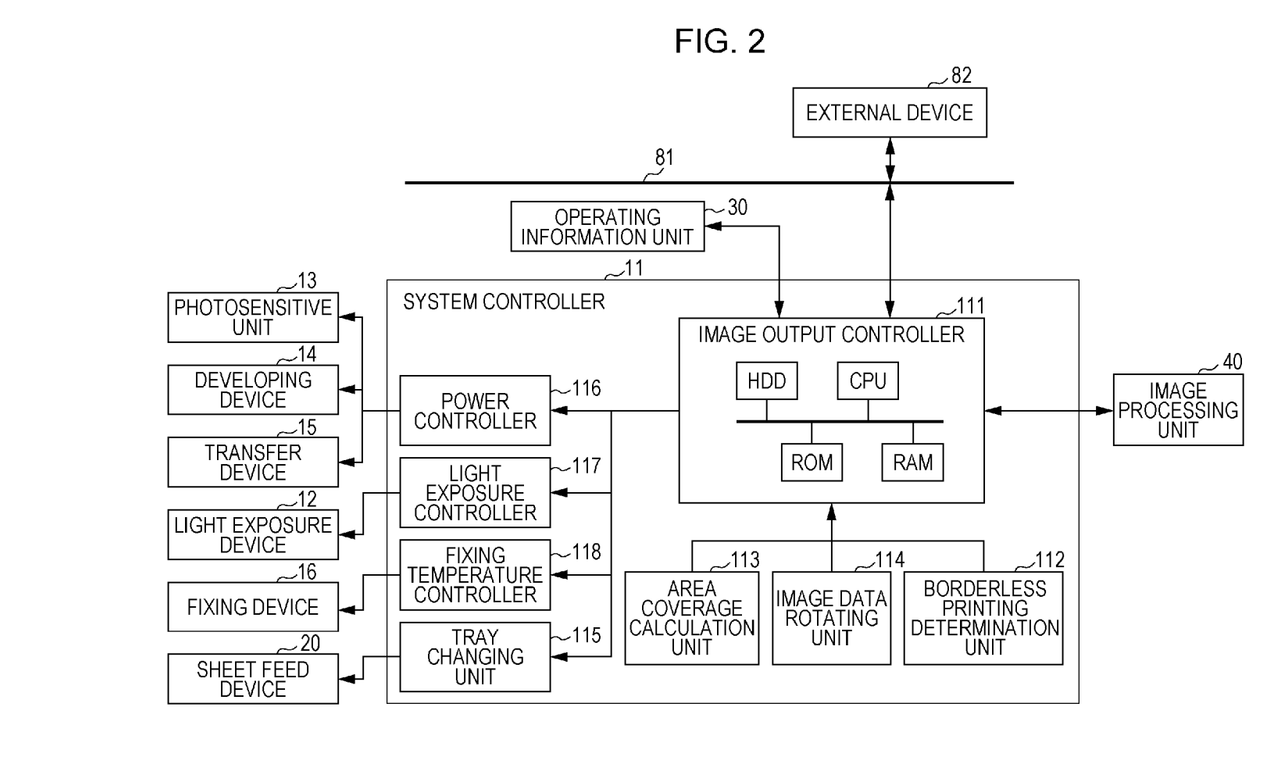
FIG. 2 is a block diagram illustrating an example of a functional configuration of the image forming apparatus.

The image processing unit 40 generates image data from print information transmitted from an external device 82 (illustrated in FIG. 2, for example, personal computer or the like).

(1.2) A Structure and Operation of the Image Forming Section

In the image forming apparatus 1 having such a structure, the sheets P are fed from the trays of the sheet feed device 20 or the tray module TM to the image forming section 10 at timing adjusted to timing of image formation. The trays of these sheets P are specified by print jobs on a sheet-by-sheet basis for printing.

The photosensitive units 13 are arranged in parallel to one another above (Z direction) the sheet feed device 20. The photosensitive units 13 include respective photosensitive drums 131 that are rotated. Electrostatic latent images are formed on the photosensitive drums 131 by the light exposure devices 12. Toner image components of yellow (Y), magenta (M), cyan (C), and black (K) are formed by the respective developing devices 14 on the photosensitive drums 131 bearing these electrostatic latent images.

The toner image components of the colors formed on the photosensitive drums 131 of the respective photosensitive units 13 are sequentially electrostatically transferred (first transfer) onto an intermediate transfer belt 151 of the transfer device 15 so as to form a toner image that is a superposed toner image in which the toner image components of the colors are superposed on one another. The superposed toner image components on the intermediate transfer belt 151 are collectively transferred by a second transfer roller 152 onto one of the sheets P fed from a registration roller pair 24 and guided by a transport guide.

The fixing device 16 includes a pair of a heating module 161 and a pressure module 162, which are in pressure contact with each other in a pressure contact region so as to define a fixing nip N (fixing region).

The sheet P onto which the toner image components have been collectively transferred in the transfer device 15 is transported to the fixing nip N of the fixing device 16 through a transport guide 153 while the toner image components are still unfixed. In this fixing nip N, the toner image components are fixed by actions of pressure and heat applied thereto by the pair of the heating module 161 and the pressure module 162.

The sheet P on which a fixed toner image has been formed is guided to a switching gate G1 so as to be, through a first output roller pair 163, output to and received in a sheet output tray TR1 provided in an upper surface of the image forming apparatus 1. Furthermore, in order to invert the sheet P for duplex printing or output the sheet P with an image recording side facing upward, a transport direction of the sheet P is changed toward a transport path 165 by the switching gate G1.

(2) A Functional Configuration of the Image Forming Apparatus 1

Figure 3A:
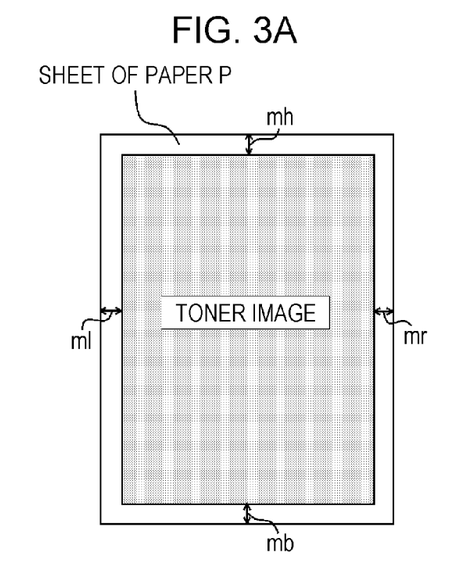
FIG. 3A illustrates bordered printing.
Figure 3B:
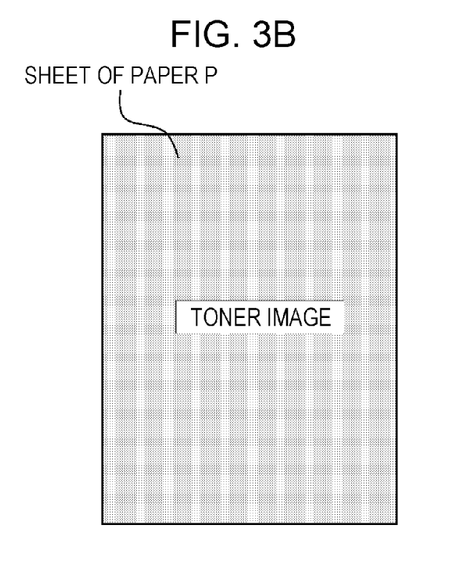
FIG. 3B illustrates borderless printing.
Figure 4A:
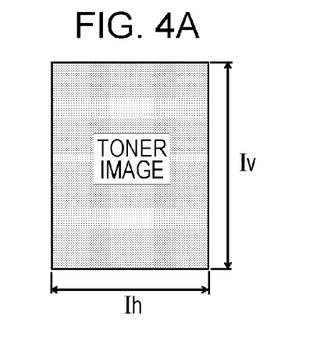
FIGS. 4A to 4C illustrate formation of a toner image for borderless printing.
Figure 4B:
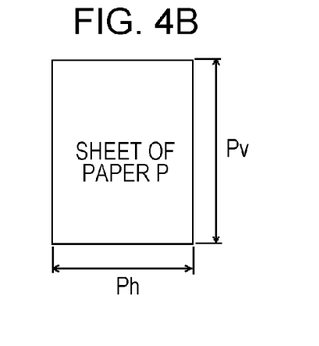
Figure 4C:
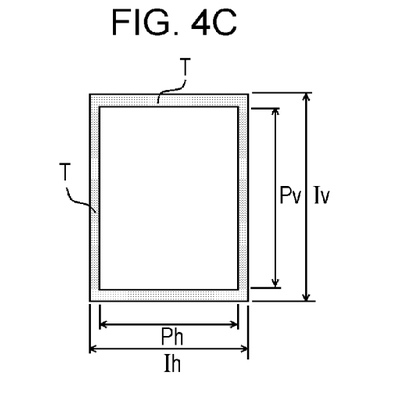
Figure 5:
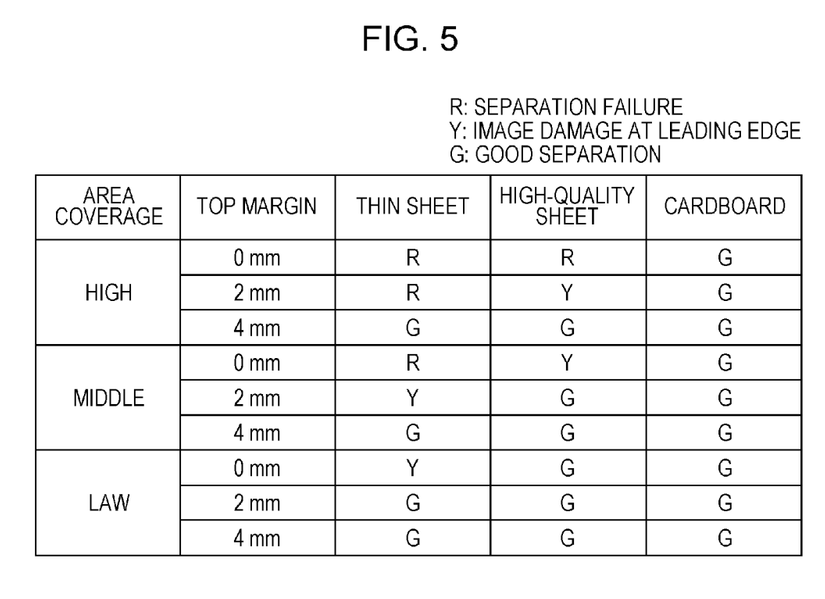
FIG. 5 illustrates examples of experimental results of separation states of a sheet at an exit of a fixing nip.

FIG. 2 is a block diagram illustrating an example of a functional configuration of the image forming apparatus 1. FIG. 3A illustrates bordered printing, and FIG. 3B illustrates borderless printing. FIGS. 4A to 4C illustrate toner image formation for borderless printing. FIG. 5 illustrates examples of results obtained in an experiment on separation states of the sheet P at an exit of the fixing nip N.

(2.1) The Functional Configuration of the System Controller

The image forming apparatus 1 includes the system controller 11 that includes an image output controller 111, a borderless printing determination unit 112, an area coverage calculation unit 113, an image data rotating unit 114, a tray changing unit 115, a power controller 116, a light exposure controller 117, and a fixing temperature controller 118. The system controller 11 controls operation of the entire image forming apparatus 1 by executing a control program stored in memory.

The image output controller 111 controls exchanging of information with the sheet feed device 20. In addition, the image output controller 111 issues operating control instructions to the following components included in the image forming section 10: that is, the light exposure devices 12, the photosensitive units 13, the developing devices 14, the transfer device 15, the fixing device 16, and so forth.

Furthermore, the image output controller 111 issues operating control instructions to the following controllers included in the system controller 11: that is, the power controller 116, the light exposure controller 117, and the fixing temperature controller 118. That is, the image output controller 111 determines whether or not to supply power to and whether or not to drive the components included in the image forming section 10, that is, the light exposure devices 12, the photosensitive units 13, the developing devices 14, the transfer device 15, the fixing device 16, and so forth and issues the results of the determination to the controllers of these components.

Furthermore, the image output controller 111 exchanges information with the borderless printing determination unit 112, the area coverage calculation unit 113, the image data rotating unit 114, and the tray changing unit 115 so as to perform predetermined operating control when the borderless printing is determined.

The borderless printing determination unit 112 determines whether the bordered printing is to be performed or the borderless printing is to be performed by detecting the presence or absence of peripheral margins in the sheet P for received image data.

As schematically illustrated in FIG. 3A, in the bordered printing, a toner image entirely fits in the sheet P with a top margin (mh), a bottom margin (mb), a left margin (ml), and a right margin (mr) set as the peripheral margins at the periphery of the sheet P.

In contrast, in the borderless printing, as illustrated in FIG. 3B, the toner image extends to end portions of the sheet P, and accordingly, none of the peripheral margins are set. Referring to FIG. 3B, there is no top margin, bottom margin, left margin, or right margin. However, when at least one of the end portions does not have its margin, it is determined that the borderless printing is to be performed.

The area coverage calculation unit 113 receives the image data, calculates, for example, the number of pixels (may instead be the number of the pixels of an electrostatic latent image) of each of the toner colors, calculates the area coverages for a recording medium, and outputs a result of area coverage calculation to the image output controller 111.

The area coverage calculation unit 113 according to the present exemplary embodiment calculates "average area coverages A1" and "highest area coverages A2" in accordance with the amount of image (pixel counts) integrated for predetermined regions at respective edges of the sheet P in the transport direction of the sheet P and a direction perpendicular to the transport direction of the sheet P. The calculated average area coverages A1 and the calculated highest area coverages A2 are stored in a predetermined area of a random access memory (RAM) of the image output controller 111.

The image data rotating unit 114 rotates the received image data by a certain angle such as, for example, 90 degrees or about 90 degrees, 180 degrees or about 180 degrees, or 270 degrees or about 270 degrees.

Along with the rotation of the image data performed by the image data rotating unit 114, the tray changing unit 115 selects one of the trays disposed in a different direction from the presently selected tray in the case where the sheets P of the same size are contained in the plural trays.

When there is no different-direction tray, a manual feed tray, which is able to supply plural types of the sheets P with high versatility, is selected in accordance with a predetermined setting.

(2.2) Borderless Printing

The image forming apparatus 1 has a bordered printing mode and a borderless printing mode. In the bordered printing mode, the image is printed on the sheet P with the margins set along the end portions at the entire periphery of the sheet P. In the borderless printing mode, the image printed on the sheet P extends to the end portions of the sheet P without the margins.

Whether or not the borderless printing is to be performed is determined by the borderless printing determination unit 112 of the system controller 11 that controls the operation of the image forming apparatus 1.

FIG. 4A illustrates the size of the toner image formed on the intermediate transfer belt 151. In FIG. 4A, Iv represents the vertical size and Ih represents the horizontal size. FIG. 4B illustrates the size of the sheet P. In FIG. 4B, the Pv represents the vertical size and Ph represents the horizontal size.

As schematically illustrated in FIG. 4C, the relationships of the sizes of the toner image and the sheet P are set so that Pv<Iv and Ph<Ih. That is, the size of the toner image is formed slightly larger than the size of the selected sheet P so that the margins are not set in the sheet P even when the sheet P is fed with the position thereof slightly misaligned vertically and horizontally.

The toner image having a size of Iv×Ih indicated by a shaded region is formed on the intermediate transfer belt 151. The toner image having a size of Iv×Ih is transported by the intermediate transfer belt 151 toward a second transfer portion TR. Meanwhile, timing control of the sheet P is performed by the registration roller pair 24 so that the sheet P is transported to the second transfer portion TR at timing adjusted to timing at which the toner image enters the second transfer portion TR. A borderless toner image without the margins at the periphery is formed on the sheet P.

The sheet P on which the borderless toner image without the margins has been formed is fixed onto the sheet P by heat and pressure in the fixing nip N of the fixing device 16. The sheet P onto which the toner image has been fixed is separated from the heating module 161 side at the exit of the fixing nip N and output to the sheet output tray TR1 in the upper surface of the image forming apparatus 1 through the first output roller pair 163. However, in the case of the sheet P on which the borderless toner image is formed, a leading edge portion of the sheet P is attracted to the heating module 161 side. This may lead to damage to the leading edge of the sheet P and arise a paper jam due to separation failure.

FIG. 5 illustrates examples of results obtained in an experiment on separation states of the sheet P at the exit of such a fixing nip N. In this experiment, the "HIGH" area coverage represents area coverages of 200 to 240% (two toner colors, multiple toner colors), the "MIDDLE" area coverage represents area coverages of 100 to 150% (single toner color, two toner colors), and the "LOW" area coverage represents area coverages of 50% or less (single toner color). The sheet type of the "THIN SHEET" represents sheets of 80 gsm or less in basis weight, the sheet type of "HIGH-QUALITY SHEET" represents sheets of 127 to 157 gsm in basis weight, and the "CARDBOARD" represents sheets of 160 gsm or more in basis weight.

According to these experimental results, when a leading edge margin of 4 mm is provided, a good separation ("G" of FIG. 5) of the sheet P is possible independently of the area coverage criteria and thickness of the sheet P.

In contrast, in the case where the leading edge margin is 0 mm, that is, in the case of the borderless printing, the results are as follows: that is, when the area coverage is "HIGH", separation failure (represented by "R" of FIG. 5) occurs with the thin sheet and the high-quality sheet; and when the area coverage is "MIDDLE", the separation failure (represented by "R" of FIG. 5) occurs with the thin sheet and the image is damaged at the leading edge portion (represented by "Y" of FIG. 5) with the high-quality sheet.

(2.2) Operation in the Borderless Printing

Figure 6:
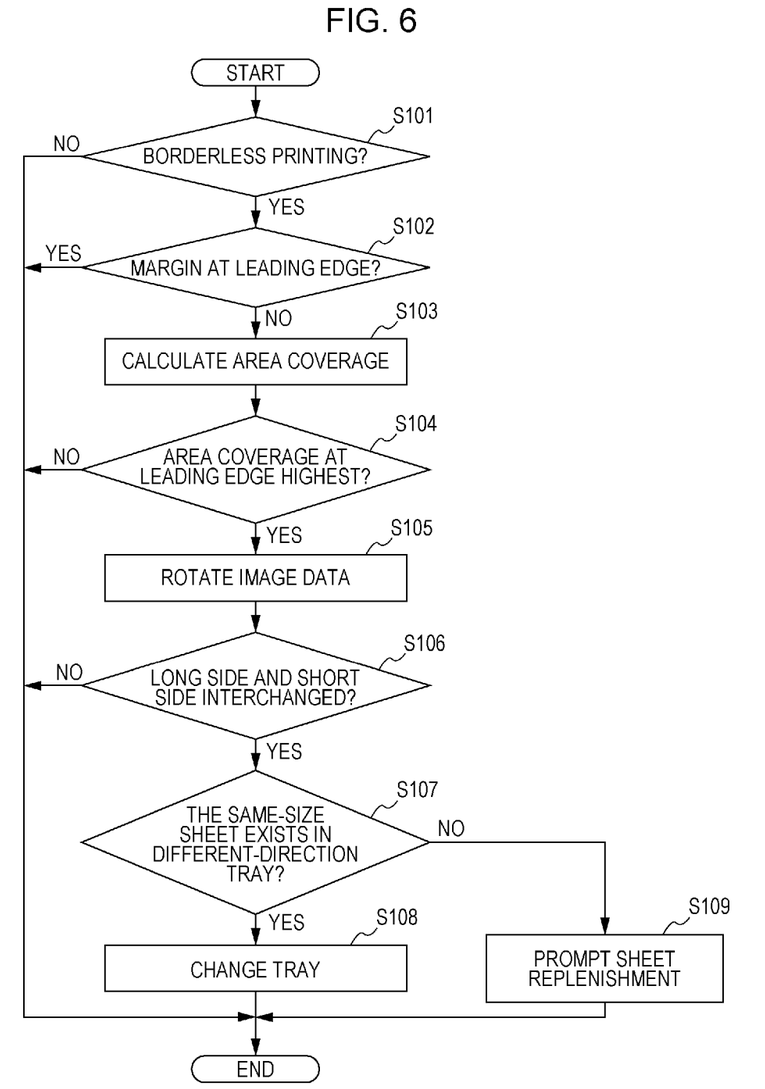
FIG. 6 is a flowchart illustrating the flow of operation of the image forming apparatus.

FIG. 6 is a flowchart illustrating the flow of operation of the image forming apparatus 1.

Operating control in the borderless printing is described below with reference to the drawings.

With the image forming apparatus 1 according to the present exemplary embodiment, when it is determined that a received print job is to be performed in the borderless printing mode, the area coverage calculation unit 113 calculates the area coverages of the predetermined regions at the edges of the sheet P. When the area coverage at the leading edge in the transport direction of the sheet P is higher than the area coverages at the other edges, the image data rotating unit 114 rotates image data.

One of the sheets P of the same transport direction as that of the rotated image data is selected from among the sheets P contained in the sheet trays so as to perform image printing.

Upon reception of the print job, the system controller 11 causes the borderless printing determination unit 112 to determine whether to perform the borderless printing or the bordered printing for the accepted print job (S101). Specifically, whether or not there are the top margin (mh), the bottom margin (mb), the left margin (ml), and the right margin (mr) at the periphery of the sheet P is detected. When at least one end portion does not have the margin, it is determined that the borderless printing is to be performed.

When it has been determined in step S101 that the borderless printing is to be performed, it is further determined whether or not the margin is provided on the leading edge side in the sheet transport direction (S102). When there is the margin along the leading edge ("YES" in S102), printing is started without rotating the image data and without a change in the image data.

When it has been determined in step S102 that there is not the margin along the leading edge ("NO" in S102), the area coverage calculation unit 113 calculates the area coverages for the certain regions at the edges of the sheet P (S103). Specifically, as the area coverages, the average area coverages A1 and the highest area coverages A2 in the predetermined regions are calculated and temporarily stored in the RAM.

It is determined that whether or not the average area coverage A1 at the leading edge is highest of the calculated average area coverages A1 at the edges of the sheet P (S104). When the average area coverage A1 at the leading edge is highest of the average area coverages A1 at the edges ("YES" in S104), the image data rotating unit 114 rotates the image data (S105). Here, when there is no clear difference in the calculated average area coverage A1 between the edges of the sheet P, the degrees of the highest area coverages A2 are compared. Furthermore, how positions where the highest area coverages A2 are observed are close to the outermost parts at the respective edges is compared.

As a result, when the highest area coverage A2 at the leading edge is highest of the highest area coverages A2 at the edges ("YES" in S104), the image data rotating unit 114 rotates the image data (S105).

When there is no difference in the average area coverage A1 and the highest area coverage A2 between the outermost parts at all the edges (for example, a solidly filled image), the image data may be transported without being rotated.

Next, when the image data has been rotated (S105), whether or not the leading edge has been changed from the long side to the short side or vice versa, that is, whether or not the leading edge that was the short side has been changed to the long side, or whether or not the leading edge that was the long side has been changed to the short side is determined (S106).

In order to change the leading edge of the image data by the rotation, when there are plural edges at which the average area coverages A1 and the highest area coverages A2 are lower than those at the original leading edge, the edge to which the original leading edge is moved by the rotation may be determined in accordance with a presetting. Examples of such a presetting include, for example, giving a priority to avoidance of changing the leading edge that is presently the long side to the short side or vice versa.

When it has been determined that the leading edge is changed from the short side to the long side or vice versa in step S106 ("YES" in S106), the tray changing unit 115 determines whether or not the sheet P of the same size as the present sheet P is contained in a tray in a different direction from the presently selected tray (S107). When the different-direction tray contains the sheet P of the same size, the tray is switched from the presently selected tray to the different-direction tray (S108) so as to print the image.

When it has been determined that the sheet P of the same size is not contained in the different-direction tray in step S107 ("NO" in S107), the system controller 11 causes the operating information unit 30 to display a prompt to replenish the different-direction tray with the sheet P (S109).

Instead of the prompt to replenish the different-direction tray with the sheet P, selection of the manual feed tray to feed the sheet P in the different direction may be prompted. In the case where the manual feed tray is selected, the sheet separation may be reliably performed in the fixing nip N with the sheet P having a higher basis weight.

Furthermore, when a sheet rotating unit 23 (not illustrated) is provided upstream of the registration roller pair 24 (illustrated in FIG. 1) in a sheet transport path, the sheet P fed from the sheet feed device 20 may be rotated by 90 degrees or by about 90 degrees by the sheet rotating unit 23.

Thus, even when the print job is performed in the borderless printing mode, by setting one of the edges at which the area coverage is lower as the leading edge, the sheet separation may be reliably performed in the fixing nip N. This may suppress contamination at the leading edge of the sheet and image defect at the leading edge portion of the sheet.

First Variant

Figure 7:
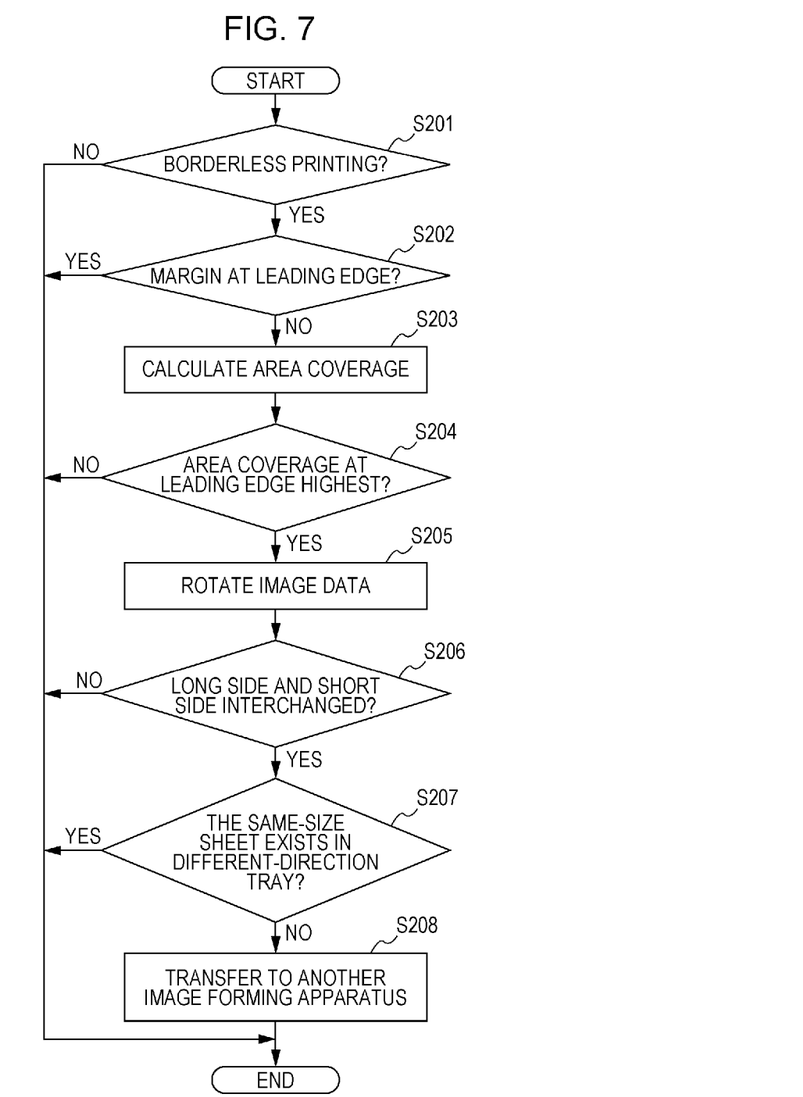
FIG. 7 is a flowchart illustrating the flow of operation of an image forming apparatus according to a first variant.

FIG. 7 is a flowchart illustrating the flow of operation of an image forming apparatus 1A according to a first variant.

According to the first variant, in the case where neither the different-direction tray nor the manual feed tray is provided when the image is rotated in the borderless printing mode, the rotated image data is transferred to another image forming apparatus. Thus, since the operating control is the same as that of the first exemplary embodiment from the determination that the received print job is to be performed in the borderless printing mode to the rotation of the image data, the operating control after the rotation of the image data is described.

With the image forming apparatus 1A, when the image data is rotated (S205) and the leading edge is changed from the short side to the long side or vice versa ("YES" in S206), the tray changing unit 115 determines whether or not the sheet P of the same size is contained in a different-direction tray from the presently selected tray (S207).

When it has been determined that the sheet P of the same size is not contained in the different-direction tray in step S207 ("NO" in S207), the system controller 11 causes the rotated image data to be transferred through a communication line 81 to another image forming apparatus that includes a different-direction tray containing the sheet P of the same size (S208). Thus, the image is printed by the other image forming apparatus.

Second Variant

Figure 8:
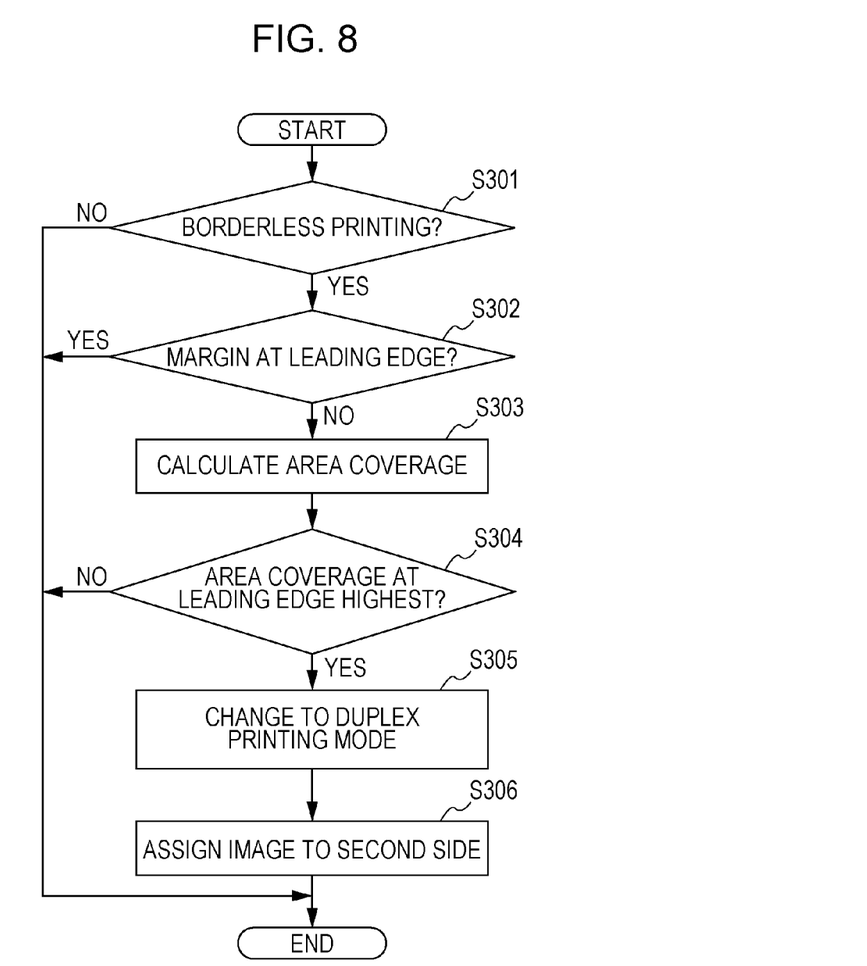
FIG. 8 is a flowchart illustrating the flow of operation of an image forming apparatus according to a second variant.

FIG. 8 is a flowchart illustrating the flow of operation of an image forming apparatus 1B according to a second variant.

According to the second variant, when the average area coverage A1 at the leading edge is highest of the average area coverages A1 at the edges ("YES" in S304) in the borderless printing mode, the image data is not rotated. Instead, operation of the image forming apparatus 1B is switched to a duplex printing mode so as to print the image data on a second side (back side) of the sheet P.

As a result, the leading edge where the average area coverage A1 is highest of the average area coverages A1 at the edges is transferred to the second side and printed on the trailing edge side in the transport direction of the sheet P. Thus, the sheet separation may be reliably performed in the fixing nip N. This may suppress contamination at the leading edge of the sheet and image defect at the leading edge portion of the sheet.

Examples

Figure 9:
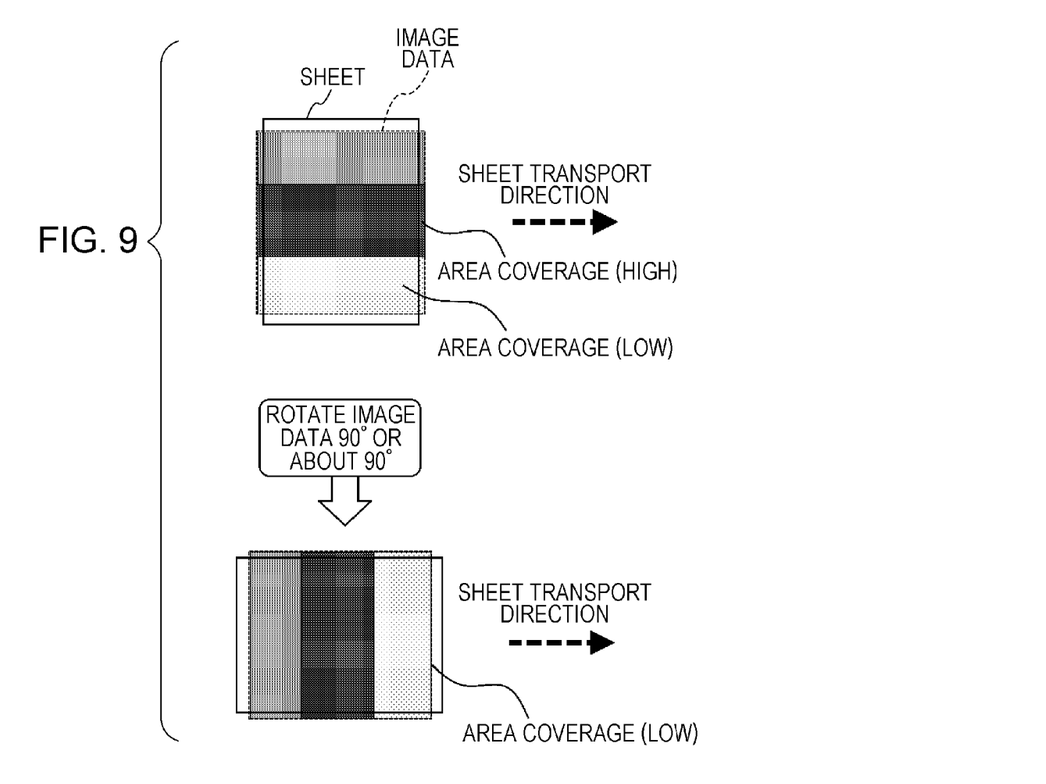
FIG. 9 is a schematic view of an example in which an image is rotated with rotation of a sheet involved when two-edge borderless printing is performed.
Figure 10:
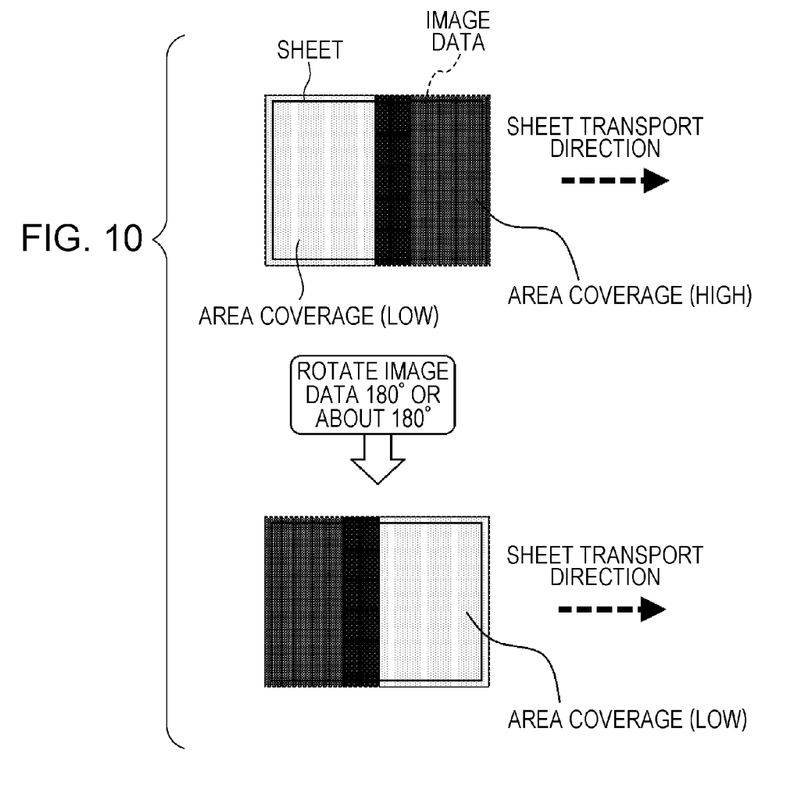
FIG. 10 is a schematic view of an example in which an image is rotated without the rotation of the sheet when four-edge borderless printing is performed.

FIG. 9 is a schematic view of an example in which an image is rotated with the rotation of the sheet P involved when two-edge borderless printing is performed. FIG. 10 is a schematic view of an example in which an image is rotated without rotation of the sheet P when four-edge borderless printing is performed.

As schematically illustrated in FIG. 9, when, with respect to the sheet P, the long sides are borderless and the short sides are bordered in the image data included in an accepted print job, the borderless printing determination unit 112 determines that the borderless printing is to be performed due to the absence of margins at the edges that are the short sides of the four edges.

Specifically, the area coverage calculation unit 113 calculates the average area coverages A1 and the highest area coverages A2 in the predetermined regions at the edges of the sheet P. The calculated results are temporarily stored in the RAM.

As a result, since the average area coverage A1 at the leading edge (long side) in the sheet transport direction is higher than the average area coverages A1 at the other edges, the image data rotating unit 114 rotates the image data by 90 degrees or about 90 degrees so that one of the short sides at which the average area coverage A1 is low becomes the leading edge, and the tray changing unit 115 changes the tray to a different-direction tray (A4 portrait) so as to print the image.

As illustrated in FIG. 10, when, with respect to the sheet P, the four edges are borderless in the image data included in an accepted print job, the borderless printing determination unit 112 determines that the four-edge borderless printing is to be performed.

Specifically, the area coverage calculation unit 113 calculates the average area coverages A1 and the highest area coverages A2 in the predetermined regions at the edges of the sheet P. The calculated results are temporarily stored in the RAM.

As a result, since the average area coverage A1 at the leading edge (short side) in the sheet transport direction is higher than the average area coverages A1 at the other edges, the image data rotating unit 114 rotates the image data by 180 degrees or about 180 degrees so that the edge that is one of the short sides at which the average area coverage A1 is low becomes the leading edge, and the sheet P is fed from the currently selected tray (A4 portrait) so as to print the image.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an image forming device that forms a toner image in accordance with image data without setting margins at edges of a first recording medium;
    an area coverage calculation section that calculates an area coverage of the image data for a certain region at each of the edges of the first recording medium; and
    an image data rotating section that rotates the image data by a certain angle, when the calculated area coverage at one of the edges is a certain value or more, so that the one of the edges is not on a leading edge side of the first recording medium in a transport direction.

2. The image forming apparatus according to claim 1, wherein the image data rotating section rotates the image data so that one of the edges the calculated area coverage of which is lowest is disposed on the leading edge side in the transport direction of the first recording medium.

3. The image forming apparatus according to claim 1, further comprising:
    a tray changing section that changes a first tray that contains the first recording medium and that is disposed in one direction to a second tray that contains a second recording medium having a size identical to a size of the first recording medium and that is disposed in a different direction from a direction in which the first tray is disposed,
    wherein the tray changing section selects the second tray when the image data is rotated by about 90 degrees in accordance with the area coverages and the second recording medium is contained in the second tray.

4. The image forming apparatus according to claim 2, further comprising:
    a tray changing section that changes a first tray that contains the first recording medium and that is disposed in one direction to a second tray that contains a second recording medium having a size identical to a size of the first recording medium and that is disposed in a different direction from a direction in which the first tray is disposed,
    wherein the tray changing section selects the second tray when the image data is rotated by about 90 degrees in accordance with the area coverages and the second recording medium is contained in the second tray.

5. The image forming apparatus according to claim 3, wherein, when the second recording medium is not contained in the second tray, a prompt to replenish the second tray with the second recording medium is displayed.

6. The image forming apparatus according to claim 4, wherein, when the second recording medium is not contained in the second tray, a prompt to replenish the second tray with the second recording medium is displayed.

7. The image forming apparatus according to claim 3, wherein, when the second recording medium is not contained in the second tray, the image data is transferred to another image forming apparatus.

8. The image forming apparatus according to claim 4, wherein, when the second recording medium is not contained in the second tray, the image data is transferred to another image forming apparatus.

* * * * *